US012647040B2

(12) United States Patent
II

(10) Patent No.: US 12,647,040 B2
(45) Date of Patent: Jun. 2, 2026

(54) SWITCHING CONTROL UNIT, ELECTRIC POWER CONVERSION APPARATUS, AND ELECTRIC POWER SUPPLY SYSTEM

(71) Applicant: TDK CORPORATION, Tokyo (JP)

(72) Inventor: Akihiro Ii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 157 days.

(21) Appl. No.: 18/465,227

(22) Filed: Sep. 12, 2023

(65) Prior Publication Data

US 2024/0128884 A1     Apr. 18, 2024

(30) Foreign Application Priority Data

Oct. 5, 2022     (JP) ................................. 2022-160879

(51) Int. Cl.
*H02M 3/335*       (2006.01)
*H02M 1/00*        (2006.01)
*H02M 7/5387*      (2007.01)

(52) U.S. Cl.
CPC ..... *H02M 3/33592* (2013.01); *H02M 1/0009* (2021.05); *H02M 7/5387* (2013.01)

(58) Field of Classification Search
CPC ............. H02M 3/33592; H02M 3/335; H02M 3/33507; H02M 3/33515; H02M 3/33571; H02M 3/33573; H02M 3/33584; H02M 1/0009; H02M 1/0003; H02M 1/0006; H02M 1/0012
See application file for complete search history.

(56) References Cited

U.S. PATENT DOCUMENTS

2010/0232180 A1      9/2010  Sase et al.
2015/0372606 A1*    12/2015  Tamura ............. H02M 3/33584
                                                         363/21.04
2020/0177089 A1*     6/2020  Abdel-Rahman ....... H02M 1/36

FOREIGN PATENT DOCUMENTS

JP      2001-292571 A     10/2001
JP      2010-213430 A      9/2010
JP      2013-176218 A      9/2013

OTHER PUBLICATIONS

Mar. 17, 2026 Office Action issued in Japanese Patent Application No. 2022-160879.

* cited by examiner

*Primary Examiner* — Nguyen Tran
(74) *Attorney, Agent, or Firm* — Oliff PLC

(57)                ABSTRACT

A switching control unit is applicable to an electric power conversion apparatus. The electric power conversion apparatus includes: a transformer; an inverter circuit including first switching devices; a synchronous rectifying circuit including second switching devices serving as rectifying devices; and a smoothing circuit. The switching control unit includes: a first current detection circuit detecting a peak current value of a secondary current; a second current detection circuit detecting an output current value; and a control circuit controlling respective operations of the first switching devices of the inverter circuit and respective operations of the second switching devices of the synchronous rectifying circuit. The control circuit sets a timing of switching from an on-state to an off-state of each of the second switching devices based on the peak current value detected by the first current detection circuit and the output current value detected by the second current detection circuit.

9 Claims, 6 Drawing Sheets

MODIFICATION EXAMPLE 1

MODIFICATION EXAMPLE 3

SWITCHING CONTROL UNIT, ELECTRIC POWER CONVERSION APPARATUS, AND ELECTRIC POWER SUPPLY SYSTEM

CROSS-REFERENCE TO RELATED APPLICATIONS

The present application claims priority from Japanese Patent Application No. 2022-160879 filed on Oct. 5, 2022, the entire contents of which are hereby incorporated by reference.

BACKGROUND

The disclosure relates to an electric power conversion apparatus that converts electric power using a switching device, a switching control unit to be applied to the electric power conversion apparatus, and an electric power supply system including the electric power conversion apparatus.

Various types of electric power conversion apparatuses or switching power supply apparatuses, including DC-to-DC converters, have been proposed. For example, reference is made to Japanese Unexamined Patent Application Publication No. 2001-292571.

SUMMARY

A switching control unit according to an embodiment of the disclosure is to be applied to an electric power conversion apparatus including a transformer, an inverter circuit, a synchronous rectifying circuit, and a smoothing circuit. The transformer includes a primary winding and a secondary winding. The inverter circuit includes a plurality of first switching devices and is disposed between a pair of input terminals and the primary winding. The pair of input terminal are configured to receive an input voltage. The synchronous rectifying circuit includes a plurality of second switching devices and is disposed between a pair of output terminals and the secondary winding. The pair of output terminals are configured to output an output voltage. The second switching devices serve as rectifying devices. The smoothing circuit is disposed between the pair of output terminals and the secondary winding. The switching control unit includes a first current detection circuit, a second current detection circuit, and a control circuit. The first current detection circuit is configured to detect a peak current value of a secondary current flowing through the secondary winding. The second current detection circuit is configured to detect a value of an output current outputted from the pair of output terminals, as an output current value. The control circuit is configured to control respective operations of the first switching devices of the inverter circuit and respective operations of the second switching devices of the synchronous rectifying circuit. The control circuit is configured to set a timing of switching from an on-state to an off-state of each of the second switching devices based on the peak current value detected by the first current detection circuit and the output current value detected by the second current detection circuit.

An electric power conversion apparatus according to an embodiment of the disclosure includes a pair of input terminals, a pair of output terminals, a transformer, an inverter circuit, a synchronous rectifying circuit, a smoothing circuit, a first current detection circuit, a second current detection circuit, and a control circuit. The pair of input terminals are configured to receive an input voltage. The pair of output terminals are configured to output an output voltage. The transformer includes a primary winding and a secondary winding. The inverter circuit includes a plurality of first switching devices and is disposed between the pair of input terminals and the primary winding. The synchronous rectifying circuit includes a plurality of second switching devices and is disposed between the pair of output terminals and the secondary winding. The second switching devices serve as rectifying devices. The smoothing circuit is disposed between the pair of output terminals and the secondary winding. The first current detection circuit is configured to detect a peak current value of a secondary current flowing through the secondary winding. The second current detection circuit is configured to detect a value of an output current outputted from the pair of output terminals, as an output current value. The control circuit is configured to control respective operations of the first switching devices of the inverter circuit and respective operations of the second switching devices of the synchronous rectifying circuit. The control circuit is configured to set a timing of switching from an on-state to an off-state of each of the second switching devices based on the peak current value detected by the first current detection circuit and the output current value detected by the second current detection circuit.

An electric power supply system according to an embodiment of the disclosure includes a pair of input terminals, a pair of output terminals, a power supply, a transformer, an inverter circuit, a synchronous rectifying circuit, a smoothing circuit, a first current detection circuit, a second current detection circuit, and a control circuit. The pair of input terminals are configured to receive an input voltage. The pair of output terminals are configured to output an output voltage. The power supply is configured to supply the input voltage to the pair of input terminals. The transformer includes a primary winding and a secondary winding. The inverter circuit includes a plurality of first switching devices and is disposed between the pair of input terminals and the primary winding. The synchronous rectifying circuit includes a plurality of second switching devices and is disposed between the pair of output terminals and the secondary winding. The second switching devices serve as rectifying devices. The smoothing circuit is disposed between the pair of output terminals and the secondary winding. The first current detection circuit is configured to detect a peak current value of a secondary current flowing through the secondary winding. The second current detection circuit is configured to detect a value of an output current outputted from the pair of output terminals, as an output current value. The control circuit is configured to control respective operations of the first switching devices of the inverter circuit and respective operations of the second switching devices of the synchronous rectifying circuit. The control circuit is configured to set a timing of switching from an on-state to an off-state of each of the second switching devices based on the peak current value detected by the first current detection circuit and the output current value detected by the second current detection circuit.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
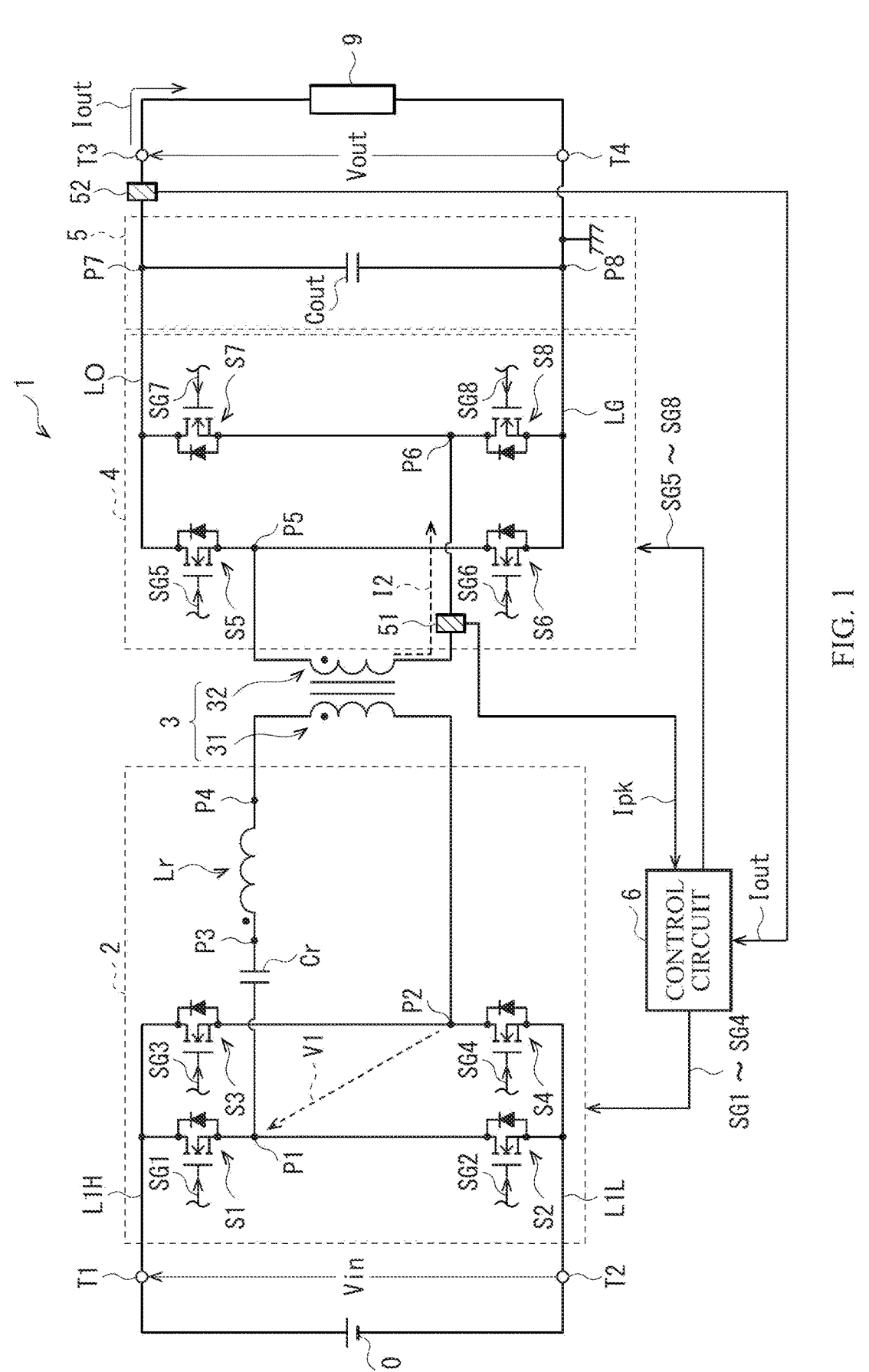
FIG. 1 is a circuit diagram illustrating a schematic configuration example of an electric power conversion apparatus according to one example embodiment of the disclosure.

It is desired that an electric power conversion apparatus be improved in efficiency and reliability.

It is desirable to provide a switching control unit, an electric power conversion apparatus, and an electric power supply system that each make it possible to improve reliability while improving efficiency.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. Note that the description is given in the following order.

1. Example Embodiment: an example in which a full-bridge circuit is provided on each of a primary side and a secondary side
2. Modification Examples
Modification Example 1: an example in which a full-bridge circuit is provided on the primary side and a center-tap circuit is provided on the secondary side
Modification Example 2: an example in which a half-bridge circuit is provided on the primary side and a full-bridge circuit is provided on the secondary side
Modification Example 3: an example in which a half-bridge circuit is provided on the primary side and a center-tap circuit is provided on the secondary side
3. Other Modification Examples

1. Example Embodiment

[Configuration]

FIG. 1 is a circuit diagram illustrating a schematic configuration example of an electric power conversion apparatus 1 according to an example embodiment of the disclosure. The electric power conversion apparatus 1 may serve as a DC-to-DC converter that performs a voltage conversion on a direct-current input voltage Vin supplied from a direct-current input power supply 10, such as a battery, into a direct-current output voltage Vout and supplies electric power to a load 9. Non-limiting examples of the load 9 may include electronic equipment and a battery. The electric power conversion apparatus 1 may be what is called an "LLC resonant" DC-to-DC converter. Note that the electric power conversion apparatus 1 may perform either an up conversion, i.e., a step-up conversion, or a down conversion, i.e., a step-down conversion, as a way of the voltage conversion.

The direct-current input voltage Vin may correspond to a specific but non-limiting example of an "input voltage" in one embodiment of the disclosure. The direct-current output voltage Vout may correspond to a specific but non-limiting example of an "output voltage" in one embodiment of the disclosure. The direct-current input power supply 10 may correspond to a specific but non-limiting example of a "power supply" in one embodiment of the disclosure. A system including the direct-current input power supply 10 and the electric power conversion apparatus 1 may correspond to a specific but non-limiting example of an "electric power supply system" in one embodiment of the disclosure.

The electric power conversion apparatus 1 includes two input terminals T1 and T2, two output terminals T3 and T4, an inverter circuit 2, a transformer 3, a synchronous rectifying circuit 4, a smoothing circuit 5, two current detection circuits 51 and 52, and a control circuit 6. The direct-current input voltage Vin may be inputted to between the input terminals T1 and T2. The direct-current output voltage Vout may be outputted from between the output terminals T3 and T4.

The input terminals T1 and T2 may correspond to a specific but non-limiting example of a "pair of input terminals" in one embodiment of the disclosure. The output terminals T3 and T4 may correspond to a specific but non-limiting example of a "pair of output terminals" in one embodiment of the disclosure. The current detection circuit 51 may correspond to a specific but non-limiting example of a "first current detection circuit" in one embodiment of the disclosure. The current detection circuit 52 may correspond to a specific but non-limiting example of a "second current detection circuit" in one embodiment of the disclosure. A combination of the current detection circuits 51 and 52 and the control circuit 6 may correspond to a specific but non-limiting example of a "switching control unit" in one embodiment of the disclosure.

For example, an input smoothing capacitor may be disposed between a primary high-voltage line L1H coupled to the input terminal T1 and a primary low-voltage line L1L coupled to the input terminal T2. The input smoothing capacitor may smooth the direct-current input voltage Vin received from the input terminals T1 and T2.

[A. Inverter Circuit 2]

The inverter circuit 2 is disposed between the input terminals T1 and T2 and a primary winding 31 of the transformer 3 to be described later. The inverter circuit 2 may include four switching devices S1 to S4, a resonant inductor Lr, and a resonant capacitor Cr. The inverter circuit 2 may be what is called a "full-bridge" inverter circuit. Note that the resonant inductor Lr may include a leakage inductance of the transformer 3 to be described later, or may be provided independently of such a leakage inductance.

The switching devices S1 to S4 may correspond to a specific but non-limiting example of a "plurality of first switching devices" in one embodiment of the disclosure.

As the switching devices S1 to S4, any of various type of switching devices including, without limitation, field-effect transistors including metal-oxide-semiconductor field-effect transistors (MOS-FETs), insulated gate bipolar transistors (IGBTs), and high electron mobility transistors (HEMTs), i.e., heterostructure field-effect transistors (HFETs), may be used. Non-limiting examples of the HEMT may include a gallium nitride (GaN) transistor.

In the example embodiment illustrated in FIG. 1, the switching devices S1 to S4 may each include a transistor configured by a MOS-FET or a HEMT. When the MOS-FETs or the HEMTs are used as the switching devices S1 to S4 in this way, respective diodes to be coupled in parallel to the switching devices S1 to S4, as illustrated in FIG. 1, may be configured by respective parasitic diodes of the MOS-FETs or the HEMTs.

In the inverter circuit 2, the two switching devices S1 and S2 may be coupled in series to each other in this order between the input terminals T1 and T2, i.e., between the primary high-voltage line L1H and the primary low-voltage line L1L. In one example, the switching device S1 may be disposed between the primary high-voltage line L1H and a node P1, and the switching device S2 may be disposed between the node P1 and the primary low-voltage line L1L. Similarly, in the inverter circuit 2, the two switching devices S3 and S4 may be coupled in series to each other in this order between the input terminals T1 and T2. In one example, the switching device S3 may be disposed between the primary high-voltage line L1H and a node P2, and the switching device S4 may be disposed between the node P2 and the primary low-voltage line L1L. Further, a first series coupling structure, or a first arm, coupling the foregoing switching devices S1 and S2 to each other and a second series coupling structure, or a second arm, coupling the foregoing switching devices S3 and S4 to each other may be disposed parallel to each other between the primary high-voltage line L1H and the primary low-voltage line L1L.

The resonant inductor Lr and the resonant capacitor Cr of the inverter circuit 2 and the primary winding 31 of the transformer 3 to be described later may be coupled in series to each other between the nodes P1 and P2 described above. In the example embodiment illustrated in FIG. 1, the resonant capacitor Cr may have a first end (i.e., one end) coupled to the node P1, and a second end (i.e., another end) coupled to a first end (i.e., one end) of the resonant inductor Lr at a node P3. As used herein, the terms "first end" and "one end" are interchangeable, and the terms "second end" and "another end" or "other end" are interchangeable. The resonant inductor Lr may have a second end coupled to a first end of the primary winding 31 at a node P4. The primary winding 31 may have a second end coupled to the node P2.

With such a configuration, in the inverter circuit 2, switching operations, i.e., ON and Off operations, of the switching devices S1 to S4 may be controlled in accordance with respective driving signals SG1 to SG4 supplied from the control circuit 6 to be described later. As a result, the direct-current input voltage Vin applied to between the input terminals T1 and T2 may be converted into an alternating-current voltage, and the alternating-current voltage may be outputted to the primary winding 31 of the transformer 3.

[B. Transformer]

The transformer 3 may include one primary winding 31 and one secondary winding 32.

The primary winding 31 may have the first end coupled to the node P4 and the second end coupled to the node P2.

The secondary winding 32 may have a first end coupled to a node P5 in the synchronous rectifying circuit 4 to be described later, and a second end coupled to a node P6 in the synchronous rectifying circuit 4.

In the transformer 3, a voltage in the form of a rectangular pulse wave generated by the inverter circuit 2 may be supplied to the primary winding 31 via a resonant circuit including the resonant capacitor Cr and the resonant inductor Lr. The voltage in the form of a rectangular pulse wave supplied to the primary winding 31 may be transformed by the transformer 3, and an alternating-current voltage resulting from the transformation may be outputted from between the first end and the second end of the secondary winding 32. Note that a degree of voltage conversion of the direct-current output voltage Vout with respect to the direct-current input voltage Vin in this case may depend on a turns ratio between the primary winding 31 and the secondary winding 32, a switching period T (where switching frequency f=1/T) to be described later, and an on-duty ratio of the inverter circuit 2. The on-duty ratio of the inverter circuit 2 may be expressed as $(\Delta ts1-\Delta td1)/(T/2)$ or as $((\Delta ts1-\Delta td1)+(\Delta ts2-\Delta td2))/T$, using shift periods $\Delta ts1$ and $\Delta ts2$ to be described later, dead times $\Delta td1$ and $\Delta td2$ to be described later, and the switching period T. The on-duty ratio of the inverter circuit 2 may also be expressed in a different way as (t3 to t4)/(T/2) or as ((t3 to t4)+(t8 to t9))/T, using a period from a timing t3 to a timing t4 and a period from a timing t8 to a timing t9 to be described later.

[C. Synchronous Rectifying Circuit 4 and Smoothing Circuit 5]

The synchronous rectifying circuit 4 may be disposed between the output terminals T3 and T4 and the secondary winding 32 of the transformer 3. In one example, the synchronous rectifying circuit 4 may be disposed between the smoothing circuit 5 to be described later and the secondary winding 32. The synchronous rectifying circuit 4 may include four switching devices S5 to S8 serving as rectifying devices, and may thus include what is called a "full-bridge" rectifying circuit. In other words, the circuit 4 may include a "full-bridge synchronous rectifying circuit" including the four switching devices S5 to S8.

For example, in the synchronous rectifying circuit 4, the two switching devices S5 and S6 serving as rectifying devices may be coupled in series to each other in this order between the output terminals T3 and T4, i.e., between an output line LO and a ground line LG. In one example, the switching device S5 may be disposed between the output line LO and the node P5, and the switching device S6 may be disposed between the node P5 and the ground line LG. Similarly, in the synchronous rectifying circuit 4, the two switching devices S7 and S8 serving as rectifying devices may be coupled in series to each other in this order between the output terminals T3 and T4. In one example, the switching device S7 may be disposed between the output line LO and the node P6, and the switching device S8 may be disposed between the node P6 and the ground line LG. Further, a third series coupling structure, or a third arm, coupling the foregoing switching devices S5 and S6 to each other and a fourth series coupling structure, or a fourth arm, coupling the foregoing switching devices S7 and S8 to each other may be disposed parallel to each other between the output line LO and the ground line LG.

The switching devices S5 to S8 may correspond to a specific but non-limiting example of a "plurality of second switching devices" serving as rectifying devices in one embodiment of the disclosure.

As with the switching devices S1 to S4 described above, any of the various type of switching devices including, without limitation, MOS-FETs, IGBTs, and HEMTs, for example, may be used as the switching devices S5 to S8.

The smoothing circuit 5 may be disposed between the output terminals T3 and T4 and the secondary winding 32. In one example, the smoothing circuit 5 may be disposed between the output terminals T3 and T4 and the synchronous rectifying circuit 4. The smoothing circuit 5 may include one output smoothing capacitor Cout and may thus be in what is called a "capacitor-input" configuration. In one example, the output smoothing capacitor Cout may be coupled between the output line LO and the ground line LG, i.e., between the output terminals T3 and T4. For example, the output smoothing capacitor Cout may have a first end coupled to the output line LO and a second end coupled to the ground line LG.

In the synchronous rectifying circuit 4 and the smoothing circuit 5 having such respective configurations, the four switching devices S5 to S8 serving as rectifying devices may rectify the alternating-current voltage outputted from the transformer 3. Further, the output smoothing capacitor Cout may smooth the rectified voltage to thereby generate the direct-current output voltage Vout. The direct-current output voltage Vout generated in this way may cause a direct-current output current Iout or a load current to flow into the load 9 described above, thus causing electric power to be supplied from the output terminals T3 and T4 to the load 9.

In the synchronous rectifying circuit 4, the switching devices S5 to S8 may be controlled to perform synchronous rectification, that is, controlled to be turned on in synchronization with periods during which respective parasitic diodes, illustrated in FIG. 1, of the switching devices S5 to S8 are conducting. In one example, switching operations, i.e., ON and Off operations, of the switching devices S5 to S8 may be controlled in accordance with respective driving signals SG5 to SG8 supplied from the control circuit 6 to be described later to cause the switching devices S5 to S8 to perform the synchronous rectification.

[D. Current Detection Circuits 51 and 52]

The current detection circuit 51 detects a peak current value Ipk of a secondary current I2, i.e., an alternating-current switching current flowing through the secondary winding 32 of the transformer 3. In the example embodiment illustrated in FIG. 1, the current detection circuit 51 may be coupled between the second end of the secondary winding 32 and the node P6 to allow the peak current value Ipk of the secondary currents I2 flowing between the second end of the secondary winding 32 and the node P6 to be detected by the current detection circuit 51. The peak current value Ipk detected by the current detection circuit 51 in this way may be outputted to the control circuit 6 to be described later.

The current detection circuit 51 may include, for example, a device such as a current transformer or a Hall element. A location where to dispose the current detection circuit 51 may be different from that in the example of FIG. 1. Non-limiting examples of the location of the current detection circuit 51 may include: a location between the first end of the secondary winding 32 and the node P5; a location between the node P5 and the output line LO where the current detection circuit 51 is couplable in series to the switching device S5; a location between the node P5 and the ground line LG where the current detection circuit 51 is couplable in series to the switching device S6; a location between the node P6 and the output line LO where the current detection circuit 51 is couplable in series to the switching device S7; a location between the node P6 and the ground line LG where the current detection circuit 51 is couplable in series to the switching device S8; a location between the synchronous rectifying circuit 4 and a node P7, and a location between the synchronous rectifying circuit 4 and a node P8. Further, the current detection circuit 51 may perform a reset operation of discharging a detected voltage at predetermined intervals and may thus use, as the peak current value Ipk, a value obtained at a point in time when charging has been performed over a period of time enough for detection values to converge. One reason for this is to allow for detection of the latest peak current value Ipk consistently even when the current decreases, for example.

The current detection circuit 52 detects an output current value, i.e., a value of the output current Iout outputted from the output terminal T3 and T4, that is, from the output smoothing capacitor Cout. In the example embodiment illustrated in FIG. 1, the current detection circuit 52 may be coupled between the node P7, i.e., a node between the output line LO and the first end of the output smoothing capacitor Cout, and the output terminal T3. The value of the output current Iout flowing from the output smoothing capacitor Cout to the output terminal T3 may thus be detected as the output current value by the current detection circuit 52, as described above. Hereinafter, the output current value is assigned the reference sign Iout common to the output current. The output current value Iout detected by the current detection circuit 52 may be outputted to the control circuit 6 to be described later. A location where to dispose the current detection circuit 52 may be different from that in the example of FIG. 1, and may be, for example, between the node P8, i.e., a node between the ground line LG and the second end of the output smoothing capacitor Cout, and the output terminal T4.

The current detection circuit 52 may include, for example, a device such as a resistor including a manganin wire, or a Hall element.

[E. Control Circuit 6]

The control circuit 6 controls the respective operations, i.e., the respective switching operations, of the switching devices S1 to S4 of the inverter circuit 2 and those of the switching devices S5 to S8 of the synchronous rectifying circuit 4. In one example, the control circuit 6 may supply the respective driving signals SG1 to SG8 to the switching devices S1 to S8 individually to thereby control the respective switching operations, i.e., the respective ON and OFF operations, of the switching devices S1 to S8 individually.

In controlling the above-described switching operations, the control circuit 6 may perform the following control, based on respective detection results obtained by the current detection circuits 51 and 52 described above. For example, the control circuit 6 sets a timing of switching from an on-state to an off-state of each of the switching devices S5 to S8 in the synchronous rectifying circuit 4, based on the peak current value Ipk detected by the current detection circuit 51 and the output current value Iout detected by the current detection circuit 52.

Details of a technique by which the control circuit 6 sets the timing of switching from the on-state to the off-state of each of the switching devices S5 to S8, for example, will be described later with reference to FIGS. 2 and 3.

[Operations, Workings, and Example Effects]

[A. Basic Operations]

In the electric power conversion apparatus 1, the direct-current input voltage Vin may be supplied from the direct-current input power supply 10 via the input terminals T1 and T2, and the switching devices S1 to S4 in the inverter circuit 2 may perform the switching operations to thereby generate a voltage in the form of a rectangular pulse wave. The voltage in the form of a rectangular pulse wave may be supplied to the primary winding 31 of the transformer 3 via the above-described resonant circuit including the resonant capacitor Cr and the resonant inductor Lr. The voltage in the form of a rectangular pulse wave supplied to the primary winding 31 may be transformed by the transformer 3, and an alternating-current voltage resulting from the transformation may thus be outputted from the secondary winding 32.

In the synchronous rectifying circuit 4, the alternating-current voltage resulting from the transformation described above and outputted from the transformer 3 may be rectified by the switching devices S5 to S8 serving as rectifying devices, and may thereafter be smoothed by the output smoothing capacitor Cout. The direct-current output voltage Vout may thus be outputted from the output terminals T3 and T4. The direct-current output voltage Vout may cause the output current Iout to flow into the load 9, thus causing electric power to be supplied to the load 9.

[B. Detailed Operation]

Figure 2:
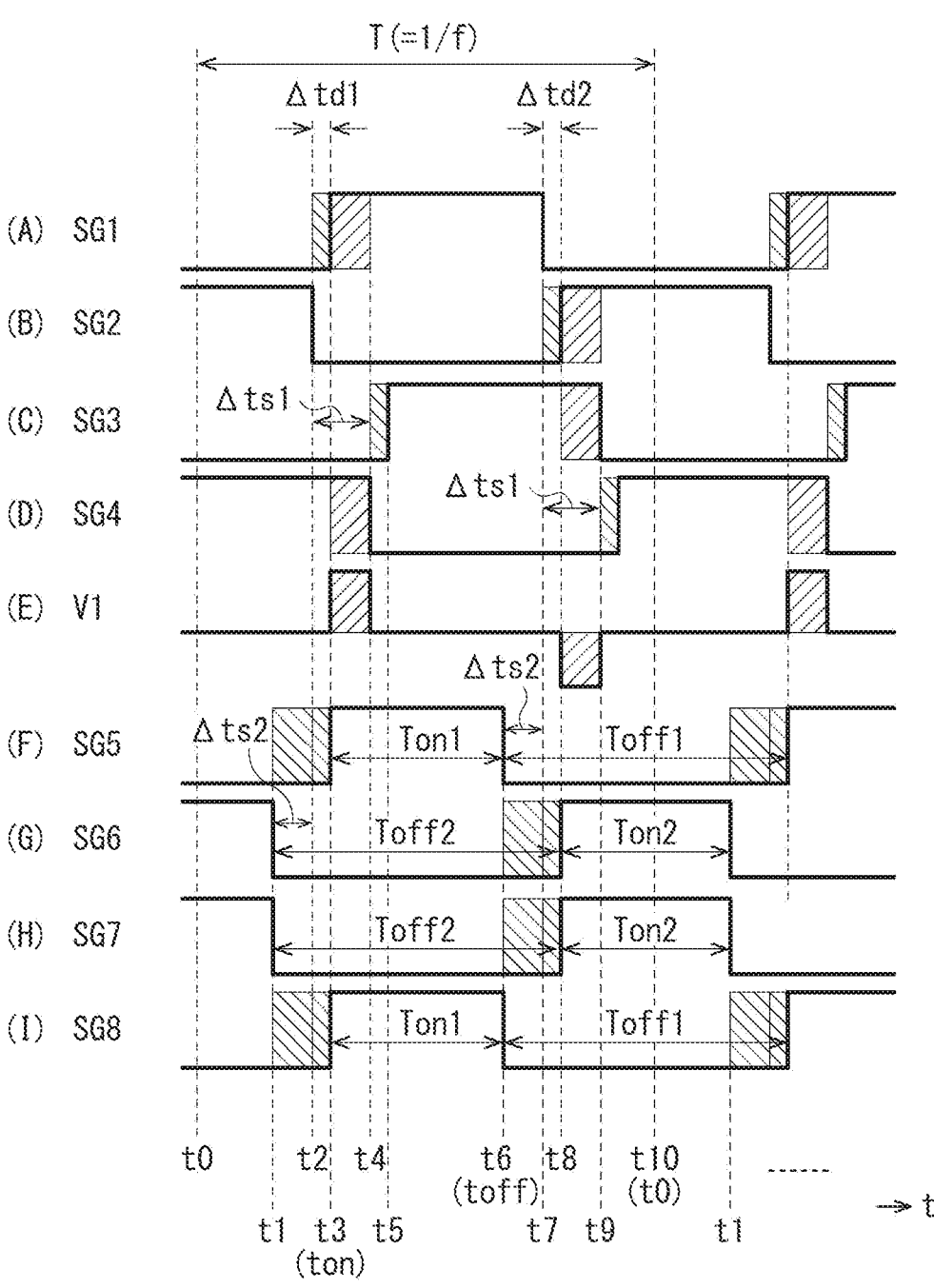
FIG. 2 is a timing chart illustrating an operation example of the electric power conversion apparatus illustrated in FIG. 1.

FIG. 2 including parts (A) to (I) is a timing chart illustrating an operation example of the electric power conversion apparatus 1 illustrated in FIG. 1. In one example, parts (A) to (D) of FIG. 2. illustrate respective waveform examples of the driving signals SG1 to SG4 described above, and parts (F) to (I) of FIG. 2 illustrate respective waveform examples of the driving signals SG5 to SG8 described above. Part (E) of FIG. 2 illustrates a waveform example of a primary voltage V1, i.e., a voltage between the nodes P1 and P2, illustrated in FIG. 1. A high-state period of each of the driving signals SG1 to SG8 may correspond to an on-state period of corresponding one of the switching devices S1 to S8. A low-state period of each of the driving signals SG1 to SG8 may correspond to an off-state period of corresponding one of the switching devices S1 to S8.

The horizontal axis in FIG. 2 represents time t. FIG. 2 also indicates an on-state period Ton1 common to the switching devices S5 and S8, an on-state period Ton2 common to the switching devices S6 and S7, an off-state period Toff1 common to the switching devices S5 and S8, and an off-state period Toff2 common to the switching devices S6 and S7. FIG. 2 also indicates the shift period Δts1 of the inverter circuit 2 and the shift period Δts2 of the synchronous rectifying circuit 4. FIG. 2 also indicates the dead time Δtd1 at the time of a rise of the waveform in the inverter circuit 2, and the dead time Δtd2 at the time of a fall of the waveform in the inverter circuit 2. FIG. 2 also indicates the switching period T (=1/switching frequency f) of the electric power conversion apparatus 1. A period from a timing t0 to a timing t10 (=t0) illustrated in FIG. 2 may correspond to the switching period T.

In the operation example of the electric power conversion apparatus 1 illustrated in FIG. 2, first, during a period from the timing t0 to a timing t1, the switching devices S2, S4, S6, and S7 may each be set to the on-state, as illustrated in parts (B), (D), (G), and (H) of FIG. 2. Further, during this period from the timing t0 to the timing t1, the switching devices S1, S3, S5, and S8 may each be set to the off-state, as illustrated in parts (A), (C), (F), and (I) of FIG. 2. Thereafter, at the timing t1, the switching devices S6 and S7 may each be switched from the on-state to the off-state, as illustrated in part (G) and (H) of FIG. 2. Thereafter, at a timing t2, the switching device S2 may switch from the on-state to the off-state as illustrated in part (B) of FIG. 2, following which at a timing t3, the switching devices S1, S5, and S8 may each switch from the off-state to the on-state as illustrated in part (A), (F), and (I) of FIG. 2. Thereafter, at a timing t4, the switching device S4 may switch from the on-state to the off-state as illustrated in part (D) of FIG. 2. During a period from the timing t3 to the timing t4, the primary voltage V1 may increase from 0 [V] to a positive voltage, where a voltage in a direction from the node P2 to the node P1 is assumed to be the positive voltage.

Thereafter, at a timing t5, the switching device S3 may switch from the off-state to the on-state as illustrated in part (C) of FIG. 2, following which at a timing t6, the switching devices S5 and S8 may each switch from the on-state to the off-state as illustrated in parts (F) and (I) of FIG. 2. Thereafter, at a timing t7, the switching device S1 may switch from the on-state to the off-state as illustrated in part (A) of FIG. 2, following which at a timing t8, the switching devices S2, S6, and S7 may each switch from the off-state to the on-state as illustrated in parts (B), (G), and (H) of FIG. 2. Thereafter, at a timing t9, the switching device S3 may switch from the on-state to the off-state as illustrated in part (C) of FIG. 2. During a period from the timing t8 to the timing t9, the primary voltage V1 may decrease from 0 [V] to a negative voltage, where the voltage in the direction from the node P2 to the node P1 is assumed to be the positive voltage. Thereafter, the switching device S4 may switch from the off-state to the on-state as illustrated in part (D) of FIG. 2, and the timing t10 (=t0) may be reached.

This completes the description of the operation example, i.e., an example of operation during the switching period T illustrated in FIG. 2, of the electric power conversion apparatus 1.

In the operation example illustrated in FIG. 2, a period from the timing t3 to the timing t6 may correspond to the on-state period Ton1 described above, and a period from the timing t6 to the timing t3 in the next switching period T may correspond to the off-state period Toff1 described above. FIG. 2 also indicates a switch timing ton, i.e., a timing of switching from the off-state to the on-state, common to the switching devices S5 and S8, and a switch timing toff, i.e., a timing of switching from the on-state to the off-state, common to the switching devices S5 and S8. The switch timing ton common to the switching devices S5 and S8 may correspond to the timing t3. The switch timing toff common to the switching devices S5 and S8 may correspond to the timing t6. Further, in the operation example illustrated in FIG. 2, a period from the timing t8 to the timing t1 in the next switching period T may correspond to the on-state period Ton2 described above, and a period from the timing t1 to the timing t8 may correspond to the off-state period Toff2 described above.

[C. Setting of Switch Timing of Switching Devices in Synchronous Rectifying Circuit 4]

In an electric power conversion apparatus, in general, synchronous rectification in a synchronous rectifying circuit may be an effective technique of increasing efficiency; however, if a switching device serving as a rectifying device is turned on at an unsuitable timing, some issues can result. For example, when the secondary current is in a discontinuous mode, a backflow current can be generated on the secondary side or a large current can be generated on the primary side, which can result in breakage of any of devices and circuits in the electric power conversion apparatus.

To prevent the generation of such a backflow current or large current, a large margin period may be set on the period of synchronous rectification, i.e., the on-state period of each of the switching devices serving as rectifying devices in the synchronous rectifying circuit to thereby narrow a duration of the on-state period. However, this can result in the following issue. For example, a duration of synchronous rectification in the on-state period decreases, whereas a duration of diode rectification, i.e., rectification by body diodes of the switching devices, in the off-state period increases. This can decrease efficiency of the electric power conversion apparatus.

In view of the foregoing, it would be difficult with a typical existing electric power conversion apparatus to improve reliability while improving efficiency.

To address this, in the electric power conversion apparatus 1 according to the example embodiment, the control circuit 6 sets the timing of switching from the on-state to the off-state, which corresponds to the switch timing toff illustrated in FIG. 2, of each of the switching devices S5 to S8 in the synchronous rectifying circuit 4 by a technique described below. In one example, the control circuit 6 sets the switch timing toff of each of the switching devices S5 to S8 based on the peak current value Ipk detected by the current detection circuit 51 and the output current value Iout detected by the current detection circuit 52.

Figure 3:
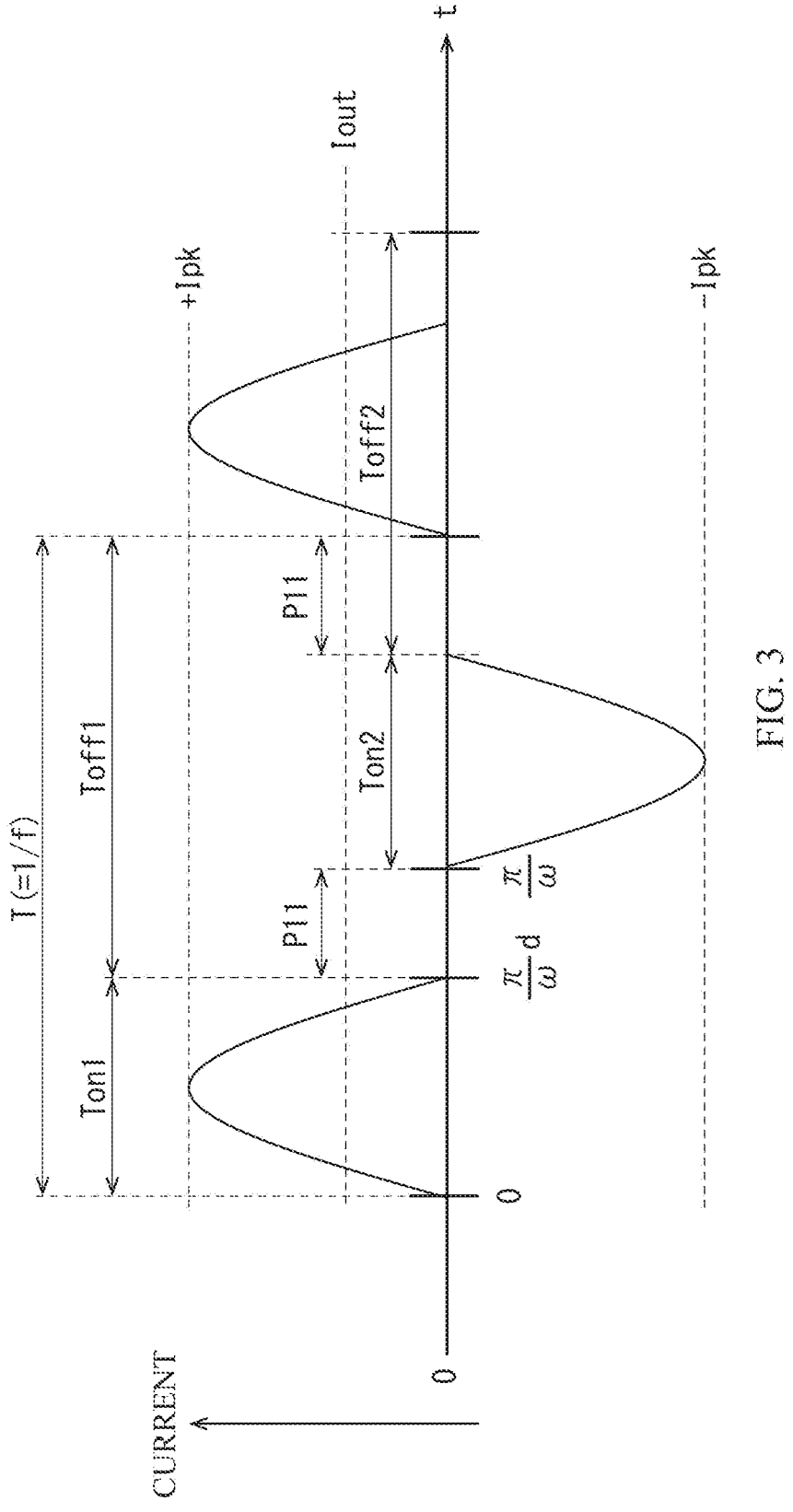
FIG. 3 is a timing chart that describes setting of a switch timing for switching devices in a synchronous rectifying circuit illustrated in FIG. 1.

FIG. 3 is a timing chart describing the setting of the above-described switch timing toff according to the example embodiment. In FIG. 3, the horizontal axis represents time t, and the vertical axis represents current.

The current in FIG. 3 is the secondary current I2 in the transformer 3. The current has a sinusoidal waveform or a waveform in which a sinusoidal wave is predominant, and is in the discontinuous mode in which curves are discontinuous. In FIG. 3, an arrow P11 indicates a discontinuous period. It may be assumed that the current in such a discontinuous mode still has sinusoidal waves with different periods, if attention is focused on portions where individual pulses rise.

In such a case, by a zeroth-order Fourier series expansion (an average value), Equation (1) below holds for the foregoing output current value Iout, using an absolute value |Ipk| of the foregoing peak current value Ipk and a duty ratio d of each of the switching devices S5 to S8. An angular frequency ω in Equation (1) may be expressed by: ω=2πf, using the switching frequency f. For the duty ratio d of each of the switching devices S5 to S8, Equation (2) below holds by transforming Equation (1).

$$
\begin{cases}
I_{out} = |I_{pk}| \times \dfrac{\omega}{\pi} \times \displaystyle\int_0^{\frac{\pi}{\omega}d} \sin\!\left(\dfrac{\omega}{d} \times t\right) dt = |I_{pk}| \times \dfrac{2}{\pi} \times d & (1) \\[4mm]
d = \dfrac{\pi}{2} \times \dfrac{I_{out}}{|I_{pk}|} & (2)
\end{cases}
$$

The control circuit 6 according to the example embodiment may set the timing of switching from the off-state to the on-state, which corresponds to the switch timing ton illustrated in FIG. 2, of each of the switching devices S5 to S8 in the following manner. For example, as illustrated in FIG. 2, the control circuit 6 may synchronize the switch timing ton of each of the switching devices S5 to S8 with a timing of switching from the off-state to the on-state of the switching device S1 or S2 in the inverter circuit 2. In one example, as illustrated in FIG. 2, the control circuit 6 may synchronize the switch timing ton of each of the switching devices S5 and S8 with the timing of switching from the off-state to the on-state of the switching device 1 in the inverter circuit 2. Further, the control circuit 6 may synchronize the switch timing ton of each of the switching devices S6 and S7 with the timing of switching from the off-state to the on-state of the switching device S2 in the inverter circuit 2.

The control circuit 6 may thus define the on-state period Ton of each of the switching devices S5 to S8 (see the on-state periods Ton1 and Ton2 illustrated in FIGS. 2 and 3) by Equation (3) below, using the value of the duty ratio d of corresponding one of the switching devices S5 to S8 defined by Equation (2) above. For example, the switch timing ton of each of the switching devices S5 to S8 may be set in a synchronized manner as described above, and the control circuit 6 may thus set the switch timing toff of each of the switching devices S5 to S8 using Equation (3):

$$Ton = \{1/(2\times f)\} \times (\pi/2) \times (|Ipk|/Iout) \qquad (3).$$

Further, the control circuit 6 may set a margin on the on-state period Ton given by Equation (3) above. In one example, the margin may be set on the on-state period Ton by replacing the value of the duty ratio d in Equation (2) above with, for example, (d×x1) or (d−x2), where 0<x1<1 and 0<x2<d. Such a margin may take account of any of factors including, without limitation, a detection error and a waveform distortion of each of the peak current value Ipk and the output current value Iout and an influence of the current in the discontinuous mode described above.

Further, the control circuit 6 may set an upper limit on the on-state period Ton. The upper limit may be, for example, 1/(2×f), that is, Ton≤1/(2×f) may be satisfied. Considering a polarity reversal upon half-wave rectification, this may be equivalent to a condition that the duty ratio d has an upper limit of 0.5 (i.e., d≤0.5). Further, the control circuit 6 may set a predetermined lower limit on each of the peak current value Ipk and the output current value Iout. One reason for this is that if the peak current value Ipk or the output current value Iout is excessively small, it can result in a significant deviation from a sinusoidal wave.

Moreover, the control circuit 6 may execute the setting of the switch timing toff of each of the switching devices S5 to S8 every single switching period T (in a case of full-wave detection, twice for respective opposite directions per switching period, and in a case of half-wave detection, once for one direction per switching period), or once every two or more switching periods T, for example. When executing the setting once every two or more switching periods T, an average of detection values obtained from two or more detection operations may be used. In other words, the control circuit 6 may execute the setting of the switch timing toff constantly every single switching period T or with a reduced frequency by setting predetermined intervals.

[D. Workings and Example Effects]

As described above, according to the example embodiment, the timing of switching from the on-state to the off-state, i.e., the switch timing toff, of each of the switching devices S5 to S8 in the synchronous rectifying circuit 4 is set based on the peak current value Ipk detected by the current detection circuit 51 and the output current value Iout detected by the current detection circuit 52. This provides some example effects described below.

For example, when the secondary current I2 is in the discontinuous mode, the generation of the backflow current on the secondary side and the generation of a large current on the primary side described above are suppressed to prevent breakage of the devices and circuits in the electric power conversion apparatus 1. Further, the technique of the example embodiment allows for setting to increase the duration of synchronous rectification in the synchronous rectifying circuit 4 as compared to a case with the existing technique described above. This prevents a reduction in efficiency that would result from an increased margin period as a measure to address the foregoing issue such as the backflow current, in contrast to the existing technique. The example embodiment thus helps to improve reliability of the electric power conversion apparatus 1 while improving efficiency thereof.

Further, according to the example embodiment, it is unnecessary to perform accurate time management, such as management of a time of current detection or a delay of a circuit, and it is only necessary to add a single detection circuit to detect the peak current value Ipk, that is, the current detection circuit 51, to the circuitry. Thus, the electric power conversion apparatus 1 according to the example embodiment is implementable with a simple configuration.

2. Modification Examples

Modification Examples 1 to 3 of the foregoing example embodiment will now be described. In the following description, the same reference signs are assigned to components the same as those in the example embodiment, and descriptions thereof will be omitted as appropriate.

Modification Example 1

[Configuration]

Figure 4:
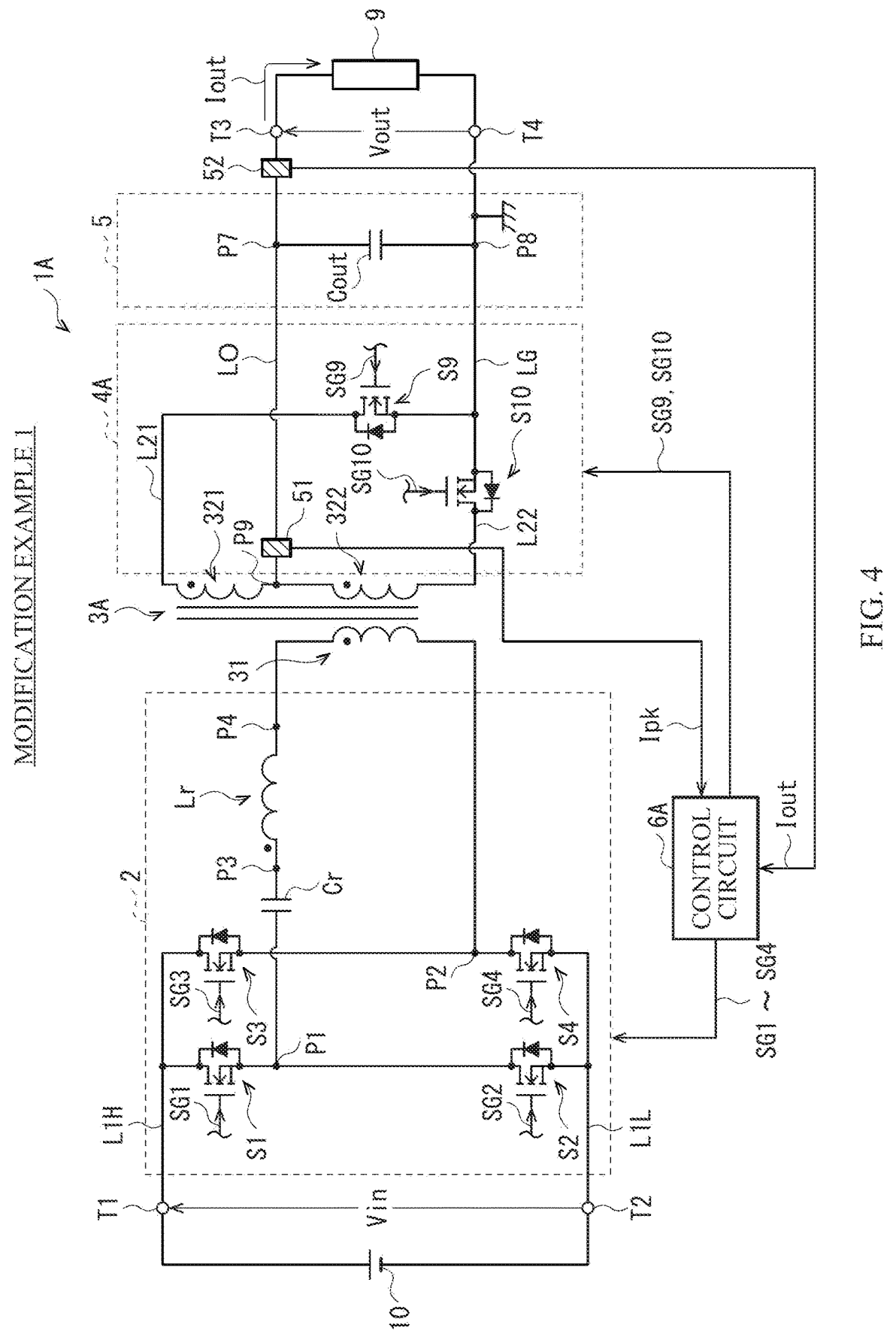
FIG. 4 is a circuit diagram illustrating a schematic configuration example of an electric power conversion apparatus according to Modification Example 1.

FIG. 4 is a circuit diagram illustrating a schematic configuration example of an electric power conversion apparatus 1A according to Modification Example 1.

As with the example embodiment, a system including the direct-current input power supply 10 and the electric power conversion apparatus 1A may correspond to a specific but non-limiting example of the "electric power supply system" in one embodiment of the disclosure.

The electric power conversion apparatus 1A according to Modification Example 1 may correspond to the electric power conversion apparatus 1 according to the example embodiment illustrated in FIG. 1 in which the transformer 3, the synchronous rectifying circuit 4, and the control circuit 6 are replaced with a transformer 3A, a synchronous rectifying circuit 4A, and a control circuit 6A, respectively, with the remainder of configuration being unchanged.

The transformer 3A may include one primary winding 31 and two secondary windings 321 and 322. Thus, in contrast to the transformer 3 including one secondary winding 32, the transformer 3A may include the two secondary windings 321 and 322.

The secondary winding 321 may have a first end coupled to the ground line LG via a coupling line L21 and a switching device S9 to be described later. The secondary winding 321 may have a second end coupled to a center tap P9 in the synchronous rectifying circuit 4A to be described later. The secondary winding 322 may have a first end coupled to the ground line LG via a coupling line L22 and a switching device S10 to be described later. The secondary winding 322 may have a second end coupled to the center tap P9. The respective second ends of the secondary windings 321 and 322 may thus be coupled in common to the center tap P9, and may also be coupled to the output line LO via the current detection circuit 51 to be described later.

In the transformer 3A also, as in the transformer 3, a voltage in the form of a rectangular pulse wave generated by the inverter circuit 2 may be supplied to the primary winding 31 via the foregoing resonant circuit including the resonant capacitor Cr and the resonant inductor Lr. The voltage in the form of a rectangular pulse wave supplied to the primary winding 31 may be transformed by the transformer 3A, and an alternating-current voltage resulting from the transformation may be outputted from between the first end and the second end of each of the secondary windings 321 and 322. Note that the degree of voltage conversion of the direct-current output voltage Vout with respect to the direct-current input voltage Vin in this case may depend on a turns ratio between the primary winding 31 and the secondary windings 321 and 322, the foregoing switching frequency f, and the foregoing on-duty ratio of the inverter circuit 2.

The synchronous rectifying circuit 4A may be disposed between the output terminals T3 and T4 and the secondary windings 321 and 322 of the transformer 3A. In one example, the synchronous rectifying circuit 4A may be disposed between the smoothing circuit 5 and the secondary windings 321 and 322. The synchronous rectifying circuit 4A may include the two switching devices S9 and S10 serving as rectifying devices, and may thus be of what is called a "center-tap" type, in contrast to the synchronous rectifying circuit 4 of the example embodiment that may be of the "full-bridge" type.

For example, in the synchronous rectifying circuit 4A, the switching devices S9 and S10 may each have a first end coupled to the ground line LG. Further, the switching device S9 may have a second end coupled to the first end of the secondary winding 321 via the coupling line L21, and the switching device S10 may have a second end coupled to the first end of the secondary winding 322 via the coupling line L22.

The switching devices S9 and S10 may correspond to a specific but non-limiting example of the "plurality of second switching devices" serving as rectifying devices in one embodiment of the disclosure.

As with the switching devices S1 to S8 described above, any of various type of switching devices including, without limitation, MOS-FETs, IGBTs, and HEMTs may be used as the switching devices S9 and S10.

In the synchronous rectifying circuit 4A of such a configuration, the two switching devices S9 and S10 serving as rectifying devices may rectify the alternating-current voltage outputted from the transformer 3A. Further, as in the example embodiment, the smoothing circuit 5 following the synchronous rectifying circuit 4A may smooth the rectified voltage to thereby generate the direct-current output voltage Vout.

In the synchronous rectifying circuit 4A, as in the synchronous rectifying circuit 4, the switching devices S9 and S10 may be controlled to perform synchronous rectification, that is, controlled to be turned on in synchronization with periods during which respective parasitic diodes, illustrated in FIG. 4, of the switching devices S9 and S10 are conducting. In one example, switching operations, i.e., ON and Off operations, of the switching devices S9 and S10 may be controlled in accordance with respective driving signals SG9 and SG10 supplied from the control circuit 6A to be described later to cause the switching devices S9 and S10 to perform the synchronous rectification.

The current detection circuit 51 of Modification Example 1 may also detect the peak current value Ipk of the secondary current I2 flowing through the secondary windings 321 and 322 of the transformer 3A, as in the example embodiment. In one example, as illustrated in FIG. 4, the current detection circuit 51 may be coupled between the center tap P9 and the node P7 on the output line LO to allow the peak current value Ipk of the secondary current I2 flowing through the secondary windings 321 and 322 to be detected by the current detection circuit 51. The peak current value Ipk detected by the current detection circuit 51 in this way may be outputted to the control circuit 6A to be described later.

The location where to dispose the current detection circuit 51 may be different from that in the example of FIG. 4. Non-limiting examples of the location of the current detection circuit 51 may include: a location that is on the coupling line L21 and between the first end of the secondary winding 321 and the ground line LG where the current detection circuit 51 is couplable in series to the switching device S9; a location that is on the coupling line L22 and between the first end of the secondary winding 322 and the ground line LG where the current detection circuit 51 is couplable in series to the switching device S10; and a location between the synchronous rectifying circuit 4A and the node P8.

The control circuit 6A controls the respective operations, i.e., the respective switching operations, of the switching devices S1 to S4 of the inverter circuit 2 and those of the switching devices S9 and S10 of the synchronous rectifying circuit 4A. In one example, the control circuit 6A may supply the respective driving signals SG1 to SG4, SG9, and SG10 to the switching devices S1 to S4, S9, and S10 individually to thereby control the respective switching operations, i.e., the respective ON and OFF operations, of the switching devices S1 to S4, S9, and S10 individually.

As with the control circuit 6 described in relation to the example embodiment, the control circuit 6A also sets the timing of switching from the on-state to the off-state of each of the switching devices S9 and S10 in the synchronous rectifying circuit 4A, based on the peak current value Ipk detected by the current detection circuit 51 and the output current value Iout detected by the current detection circuit 52.

A combination of the current detection circuits 51 and 52 and the control circuit 6A may correspond to a specific but non-limiting example of the "switching control unit" in one embodiment of the disclosure.

Workings and Example Effects

With the electric power conversion apparatus 1A according to Modification Example 1 having such a configuration, it is basically possible to achieve effects similar to those of the electric power conversion apparatus 1 according to the example embodiment, through similar workings.

Modification Examples 2 and 3

[Configuration]

Figure 5:
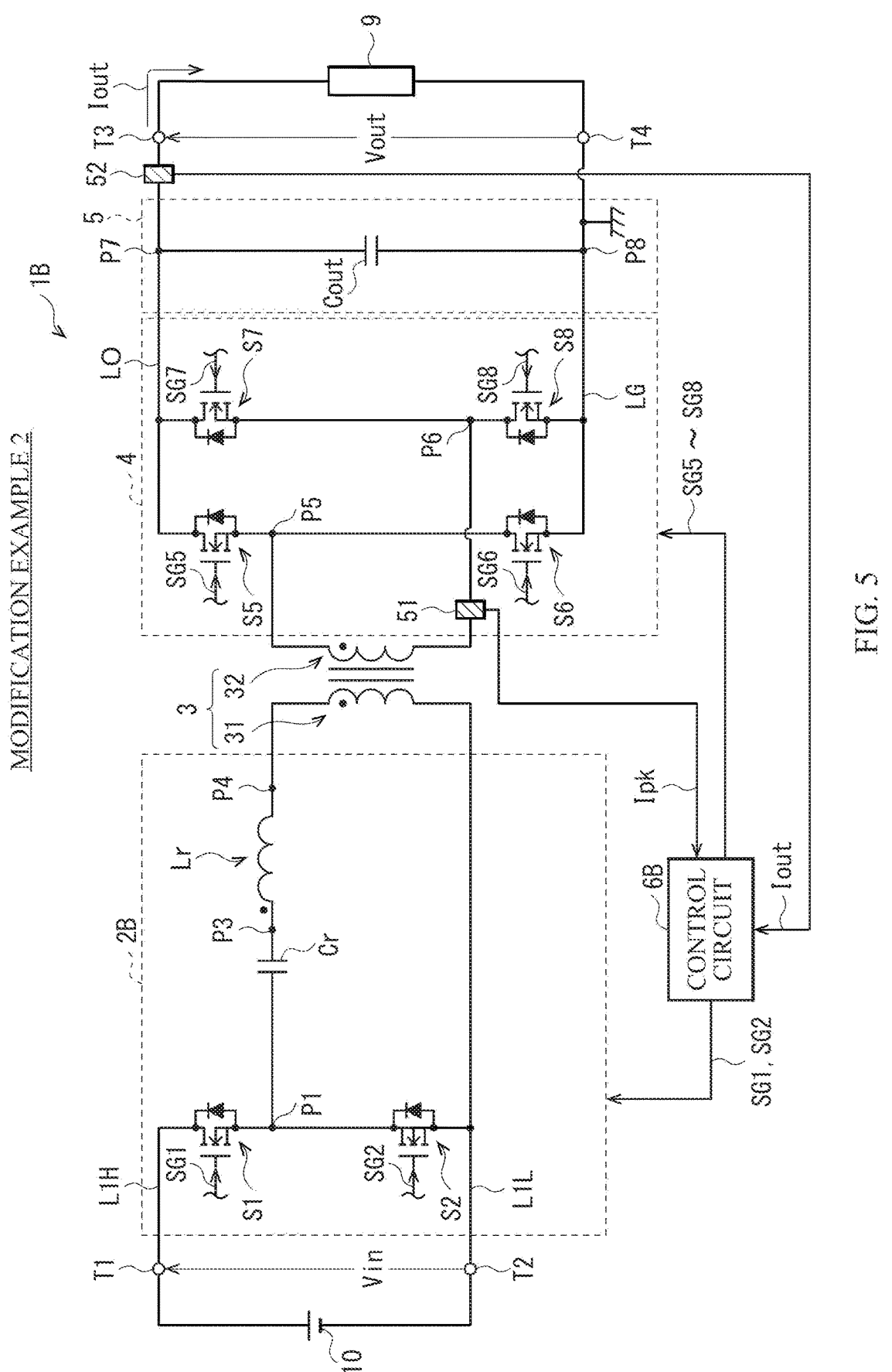
FIG. 5 is a circuit diagram illustrating a schematic configuration example of an electric power conversion apparatus according to Modification Example 2.
Figure 6:
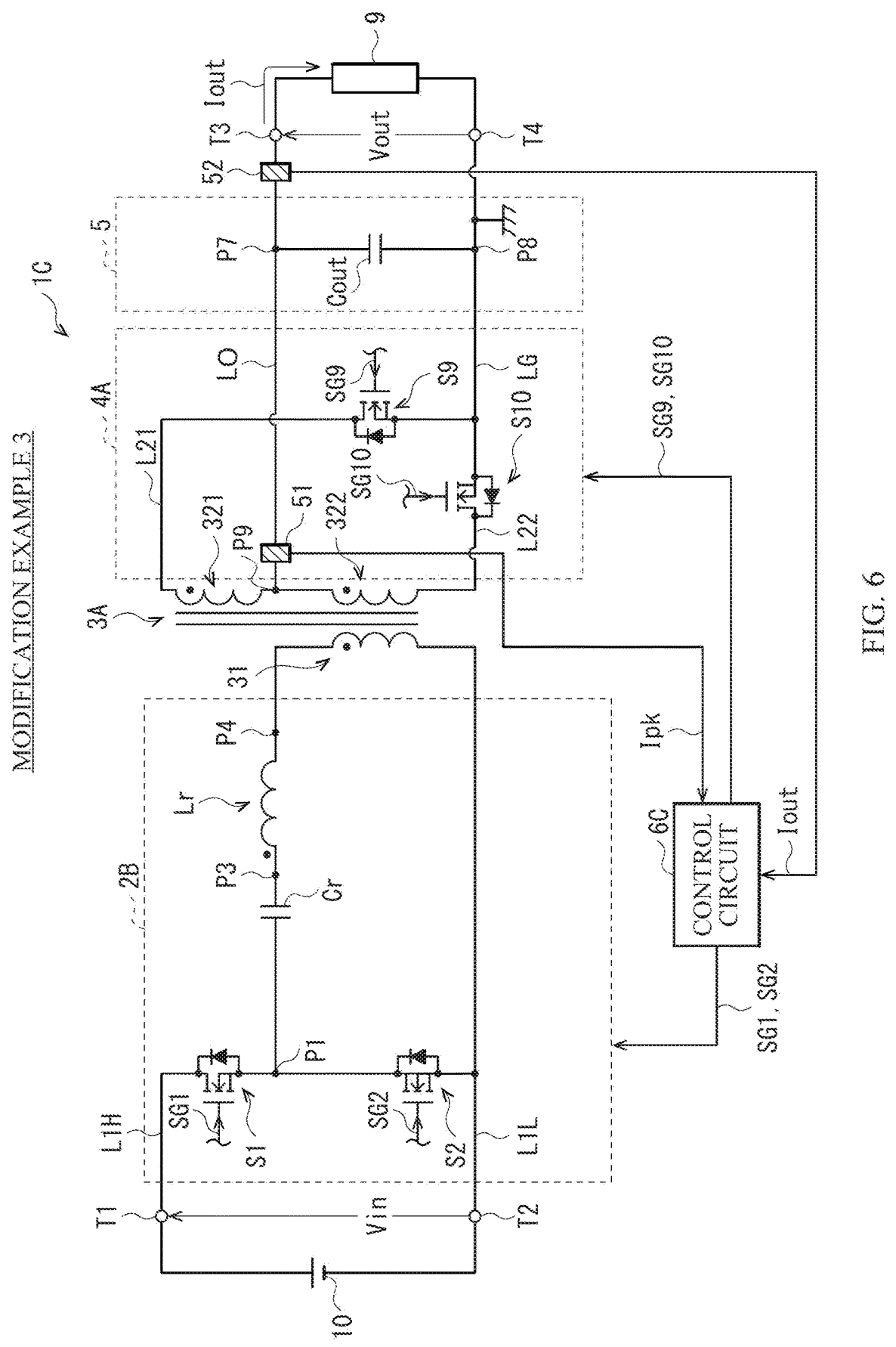
FIG. 6 is a circuit diagram illustrating a schematic configuration example of an electric power conversion apparatus according to Modification Example 3.

FIG. 5 is a circuit diagram illustrating a schematic configuration example of an electric power conversion apparatus 1B according to Modification Example 2. FIG. 6 is a circuit diagram illustrating a schematic configuration example of an electric power conversion apparatus 1C according to Modification Example 3.

As with the example embodiment and Modification Example 1, a system including the direct-current input power supply 10 and the electric power conversion apparatus 1B and a system including the direct-current input power supply 10 and the electric power conversion apparatus 1C may each correspond to a specific but non-limiting example of the "electric power supply system" in one embodiment of the disclosure.

The electric power conversion apparatuses 1B and 1C according to Modification Examples 2 and 3 may have configurations modified from the configuration of the example embodiment and the configuration of Modification Example 1, respectively, as described below. For example, the electric power conversion apparatuses 1B and 1C may each include what is called a "half-bridge" inverter circuit 2B instead of the "full-bridge" inverter circuit 2 described above. The electric power conversion apparatus 1B may include a control circuit 6B instead of the control circuit 6. The electric power conversion apparatus 1C may include a control circuit 6C instead of the control circuit 6A.

A combination of the current detection circuits 51 and 52 and the control circuit 6B and a combination of the current detection circuits 51 and 52 and the control circuit 6C may each correspond to a specific but non-limiting example of the "switching control unit" in one embodiment of the disclosure.

The inverter circuit 2B of Modification Example 2 illustrated in FIG. 5 may be disposed between the input terminals T1 and T2 and the primary winding 31 of the transformer 3. The inverter circuit 2B of Modification Example 3 illustrated in FIG. 6 may be disposed between the input terminals T1 and T2 and the primary winding 31 of the transformer 3A. The inverter circuit 2B of each of Modification Examples 2 and 3 may include two switching devices S1 and S2, the resonant inductor Lr, and the resonant capacitor Cr, and may thus be what is called a "half-bridge" inverter circuit. For example, the inverter circuit 2 of each of the example embodiment and Modification Example 1 may be a "full-bridge" inverter circuit including the four switching devices S1 to S4. In contrast, the inverter circuit 2B may be a "half-bridge" inverter circuit including the two switching devices S1 and S2.

The two switching devices S1 and S2 of the inverter circuit 2B may correspond to a specific but non-limiting example of the "plurality of first switching devices" in one embodiment of the disclosure.

In the inverter circuit 2B, the two switching devices S1 and S2 may be coupled in series to each other in this order between the input terminals T1 and T2, i.e., between the primary high-voltage line L1H and the primary low-voltage line L1L. In one example, the switching device S1 may be disposed between the primary high-voltage line L1H and the node P1, and the switching device S2 may be disposed between the node P1 and the primary low-voltage line L1L.

The resonant inductor Lr and the resonant capacitor Cr of the inverter circuit 2B and the primary winding 31 of the transformer 3 or 3A may be coupled in series to each other between the node P1 and the primary low-voltage line L1L. In one example, as illustrated in each of FIGS. 5 and 6, the resonant capacitor Cr may have the first end coupled to the node P1 and the second end coupled to the first end of the resonant inductor Lr at the node P3. The second end of the resonant inductor Lr may be coupled to the first end of the primary winding 31 at the node P4, and the second end of the primary winding 31 may be coupled to the primary low-voltage line L1L.

With such a configuration, in the inverter circuit 2B, the switching operations, i.e., the ON and Off operations, of the switching devices S1 and S2 may be controlled in accordance with the respective driving signals SG1 and SG2 supplied from the control circuit 6B or 6C. As a result, as in the case of the inverter circuit 2, the direct-current input voltage Vin applied to between the input terminals T1 and T2 may be converted into a voltage in the form of a rectangular pulse wave, and the converted voltage may be outputted to the primary winding 31 of the transformer 3 or 3A via the foregoing resonant circuit including the resonant capacitor Cr and the resonant inductor Lr.

The control circuit 6B of Modification Example 2 illustrated in FIG. 5 controls the respective operations, i.e., the respective switching operations, of the switching devices S1 and S2 of the inverter circuit 2B and those of the switching devices S5 to S8 of the synchronous rectifying circuit 4. In one example, the control circuit 6B may supply the respective driving signals SG1, SG2, and SG5 to SG8 to the switching devices S1, S2, and S5 to S8 individually to thereby control the respective switching operations, i.e., the respective ON and OFF operations, of the switching devices S1, S2, and S5 to S8 individually.

The control circuit 6C of Modification Example 3 illustrated in FIG. 6 controls the respective operations, i.e., the respective switching operations, of the switching devices S1 and S2 of the inverter circuit 2B and those of the switching devices S9 and S10 of the synchronous rectifying circuit 4A. In one example, the control circuit 6C may supply the respective driving signals SG1, SG2, SG9, and SG10 to the switching devices S1, S2, S9, and S10 individually to thereby control the respective switching operations, i.e., the respective ON and OFF operations, of the switching devices S1, S2, S9, and S10 individually.

As with the control circuits 6 and 6A described in relation to the example embodiment and Modification Example 1, the control circuits 6B and 6C may also perform the following control, based on the peak current value Ipk detected by the current detection circuit 51 and the output current value Iout detected by the current detection circuit 52. For example, the control circuit 6B sets the timing of switching from the on-state to the off-state of each of the switching devices S5 to S8 in the synchronous rectifying circuit 4, and the control circuit 6C sets the timing of switching from the on-state to the off-state of each of the switching devices S9 and S10 in the synchronous rectifying circuit 4A.

Workings and Example Effects

With the electric power conversion apparatuses 1B and 1C according to Modification Examples 2 and 3 having such respective configurations, it is basically possible to achieve effects similar to those of the foregoing electric power conversion apparatuses 1 and 1A, respectively, through similar workings.

3. Other Modification Examples

The disclosure has been described above with reference to the example embodiment and the modification examples. However, embodiments of the disclosure are not limited thereto, and various modifications may be made.

For example, in the foregoing example embodiment and modification examples, description has been given of example configurations of the inverter circuit; however, such examples are non-limiting, and any other suitable configuration may be employed for the inverter circuit. Further, in the foregoing example embodiment and modification examples, description has been given of example configurations of the synchronous rectifying circuit; however, such examples are non-limiting, and any other suitable configuration may be employed for the synchronous rectifying circuit. Moreover, in the foregoing example embodiment and modification examples, description has been given of example configurations of the smoothing circuit; however, the smoothing circuit is not limited to what is called a "capacitor-input" smoothing circuit of the foregoing examples. In some embodiments, the smoothing circuit may be what is called a "choke-input" smoothing circuit including an inductor and a capacitor in combination.

Further, in the foregoing example embodiment and modification examples, description has been given of example configurations of the transformer including the one primary winding and the one or more secondary windings; however, such examples are non-limiting, and any other suitable configuration may be employed for the transformer.

Moreover, in the foregoing example embodiment and modification examples, description has been given of example configurations and example locations of the current detection circuits 51 and 52; however, such examples are non-limiting, and the current detection circuits 51 and 52 may each have any other suitable configuration or may each be disposed at any other suitable location. Further, the current detection circuits may not necessarily be provided inside the switching control unit or the electric power conversion apparatus as described in the foregoing example embodiment and modification examples. In some embodiments, at least one of the current detection circuits may be provided outside the switching control unit or outside the electric power conversion apparatus.

In addition, in the foregoing example embodiment and modification examples, description has been given of an example technique by which the control circuit sets the switch timing of each of the switching devices in the synchronous rectifying circuit; however, such an example is non-limiting, and any other suitable technique may be employed for the setting of the switch timing by the control circuit. Further, in the foregoing example embodiment and modification examples, description has been given of an example case where the current may have a sinusoidal waveform or a waveform in which a sinusoidal wave is predominant; however, such an example is non-limiting. In some embodiments, the current may have any of other suitable waveforms including, without limitation, a triangular waveform and a sawtooth waveform.

Further, in the foregoing example embodiment and modification examples, description has been given of an "LLC resonant" DC-to-DC converter as an example of the electric power conversion apparatus according to an embodiment of the disclosure; however, such an example is non-limiting. In some embodiments, the electric power conversion apparatus may be another type of DC-to-DC converter such as a "CLLC resonant" DC-to-DC converter. In one example, an additional resonant capacitor may be provided on the secondary side of the transformer to configure the "CLLC resonant" DC-to-DC converter. Referring to FIG. 1, such an additional resonant capacitor may be disposed between the secondary winding 32 and the node P5. In such a case, it is possible for the control circuit to set the switch timing not only when performing electric power transmission from the primary side to the secondary side of the transformer, i.e., when performing operation in a charging direction but also when performing electric power transmission from the secondary side to the primary side of the transformer, i.e., when performing operation in a discharging direction. For example, when performing the operation in the discharging direction, it is also possible for the control circuit to set the switch timing by the technique described in relation to the example embodiment and the modification examples, based on a result of detection of the peak current value Ipk and a result of detection of the output current value Iout obtained on the primary side.

Moreover, examples of the DC-to-DC converters to which an embodiment of the disclosure is applicable are not limited to those of the "LLC resonant" type and the "CLLC resonant" type, and may further include DC-to-DC converters of other types including, without limitation, an LC series resonant type, an LC parallel resonant type, a partial resonant type, and a single-transistor forward type. In addition, any embodiment of the disclosure is applicable not only to a resonant DC-to-DC converter and an isolated DC-to-DC converter but also to a non-resonant DC-to-DC converter and a non-isolated DC-to-DC converter. Further, any embodiment of the disclosure is applicable not only to the DC-to-DC converters but also to any of other kinds of electric power conversion apparatuses, such as AC-to-DC converters.

Moreover, any two or more of the configuration examples described so far may be combined and applied in a desired manner. The disclosure encompasses any possible combination of some or all of the various embodiments described herein and incorporated herein.

The effects described herein are mere examples and non-limiting, and other effects may be achieved.

It is possible to achieve at least the following configurations from the foregoing example embodiment and modification examples of the disclosure.

(1)

A switching control unit applicable to an electric power conversion apparatus, the electric power conversion apparatus including: a transformer including a primary winding and a secondary winding; an inverter circuit including a plurality of first switching devices and disposed between a pair of input terminals and the primary winding, the pair of input terminals being configured to receive an input voltage; a synchronous rectifying circuit including a plurality of second switching devices and disposed between a pair of output terminals and the secondary winding, the pair of output terminals being configured to output an output voltage, the second switching devices serving as rectifying devices; and a smoothing circuit disposed between the pair of output terminals and the secondary winding, the switching control unit including a first current detection circuit configured to detect a peak current value of a secondary current flowing through the secondary winding, a second current detection circuit configured to detect a value of an output current outputted from the pair of output terminals, as an output current value, and a control circuit configured to control respective operations of the first switching devices of the inverter circuit and respective operations of the second switching devices of the synchronous rectifying circuit, in which the control circuit is configured to set a timing of switching from an on-state to an off-state of each of the second switching devices based on the peak current value detected by the first current detection circuit and the output current value detected by the second current detection circuit.

(2)

The switching control unit according to (1), in which the control circuit is configured to set the timing of switching from the on-state to the off-state of each of the second switching devices using an equation below:

$$Ton=\{1/(2\times f)\}\times(\pi/2)\times(|Ipk|/Iout)$$

where Ton represents a period of the on-state of corresponding one of the second switching devices, Ipk represents the peak current value, Iout represents the output current value, and f represents a switching frequency.

(3)

The switching control unit according to (2), in which the control circuit is configured to further set a margin on the period Ton given by the equation.

(4)

The switching control unit according to (2) or (3), in which the control circuit is configured to set an upper limit of 1/(2×f) on the period Ton.

(5)

The switching control unit according to any one of (1) to (4), in which the control circuit is configured to set a lower limit on each of the peak current value and the output current value.

(6)

The switching control unit according to any one of (1) to (5), in which the control circuit is configured to execute setting of the timing of switching from the on-state to the off-state of each of the second switching devices every single switching period of corresponding one of the second switching devices or once every two or more switching periods of the corresponding one of the second switching devices.

(7)

The switching control unit according to any one of (1) to (6), in which the control circuit is configured to synchronize a timing of switching from the off-state to the on-state of each of the second switching devices with a timing of switching from an off-state to an on-state of corresponding one of the first switching devices.

(8)

The switching control unit according to any one of (1) to (7), in which the synchronous rectifying circuit includes a full-bridge synchronous rectifying circuit and the second switching devices include four second switching devices.

(9)

An electric power conversion apparatus including:
a pair of input terminals configured to receive an input voltage;
a pair of output terminals configured to output an output voltage;
a transformer including a primary winding and a secondary winding;
an inverter circuit including a plurality of first switching devices and disposed between the pair of input terminals and the primary winding;
a synchronous rectifying circuit including a plurality of second switching devices and disposed between the pair of output terminals and the secondary winding, the second switching devices serving as rectifying devices;
a smoothing circuit disposed between the pair of output terminals and the secondary winding;
a first current detection circuit configured to detect a peak current value of a secondary current flowing through the secondary winding;
a second current detection circuit configured to detect a value of an output current outputted from the pair of output terminals, as an output current value; and
a control circuit configured to control respective operations of the first switching devices of the inverter circuit and respective operations of the second switching devices of the synchronous rectifying circuit, in which
the control circuit is configured to set a timing of switching from an on-state to an off-state of each of the second switching devices based on the peak current value detected by the first current detection circuit and the output current value detected by the second current detection circuit.

(10)

An electric power supply system including:
a pair of input terminals configured to receive an input voltage;

a pair of output terminals configured to output an output voltage;

a power supply configured to supply the input voltage to the pair of input terminals;

a transformer including a primary winding and a secondary winding;

an inverter circuit including a plurality of first switching devices and disposed between the pair of input terminals and the primary winding;

a synchronous rectifying circuit including a plurality of second switching devices and disposed between the pair of output terminals and the secondary winding, the second switching devices serving as rectifying devices;

a smoothing circuit disposed between the pair of output terminals and the secondary winding;

a first current detection circuit configured to detect a peak current value of a secondary current flowing through the secondary winding;

a second current detection circuit configured to detect a value of an output current outputted from the pair of output terminals, as an output current value; and a control circuit configured to control respective operations of the first switching devices of the inverter circuit and respective operations of the second switching devices of the synchronous rectifying circuit, in which the control circuit is configured to set a timing of switching from an on-state to an off-state of each of the second switching devices based on the peak current value detected by the first current detection circuit and the output current value detected by the second current detection circuit.

The switching control unit, the electric power conversion apparatus, and the electric power supply system according to at least one embodiment of the disclosure each make it possible to improve reliability while improving efficiency.

Although the technology has been described hereinabove in terms of the example embodiment and modification examples, the technology is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A switching control unit applicable to an electric power conversion apparatus, the electric power conversion apparatus including: a transformer including a primary winding and a secondary winding; an inverter circuit including a plurality of first switching devices and disposed between a pair of input terminals and the primary winding, the pair of input terminals being configured to receive an input voltage;

a synchronous rectifying circuit including a plurality of second switching devices and disposed between a pair of output terminals and the secondary winding, the pair of output terminals being configured to output an output voltage, the second switching devices serving as rectifying devices; and a smoothing circuit disposed between the pair of output terminals and the secondary winding, the switching control unit comprising a first current detection circuit configured to detect a peak current value of a secondary current flowing through the secondary winding, a second current detection circuit configured to detect a value of an output current outputted from the pair of output terminals, as an output current value, and a control circuit configured to control respective operations of the first switching devices of the inverter circuit and respective operations of the second switching devices of the synchronous rectifying circuit, wherein the control circuit is configured to set a timing of switching from an on-state to an off-state of each of the second switching devices based on the peak current value detected by the first current detection circuit and the output current value detected by the second current detection circuit, and wherein the control circuit is configured to set the timing of switching from the on-state to the off-state of each of the second switching devices using an equation below:

$$Ton=\{1/(2{\times}f)\}{\times}(\pi/2){\times}(|Ipk|/Iout)$$

where Ton represents a period of the on-state of corresponding one of the second switching devices, Ipk represents the peak current value, Iout represents the output current value, and f represents a switching frequency.

2. The switching control unit according to claim 1, wherein the control circuit is configured to further set a margin on the period Ton given by the equation.

3. The switching control unit according to claim 1, wherein the control circuit is configured to set an upper limit of $1/(2{\times}f)$ on the period Ton.

4. The switching control unit according to claim 1, wherein the control circuit is configured to set a lower limit on each of the peak current value and the output current value.

5. The switching control unit according to claim 1, wherein the control circuit is configured to execute setting of the timing of switching from the on-state to the off-state of each of the second switching devices every single switching period of corresponding one of the second switching devices or once every two or more switching periods of the corresponding one of the second switching devices.

6. The switching control unit according to claim 1, wherein the control circuit is configured to synchronize a timing of switching from the off-state to the on-state of each of the second switching devices with a timing of switching from an off-state to an on-state of corresponding one of the first switching devices.

7. The switching control unit according to claim 1, wherein the synchronous rectifying circuit comprises a full-bridge synchronous rectifying circuit and the second switching devices comprise four second switching devices.

8. An electric power conversion apparatus comprising:

a pair of input terminals configured to receive an input voltage;

a pair of output terminals configured to output an output voltage;

a transformer including a primary winding and a secondary winding;

an inverter circuit including a plurality of first switching devices and disposed between the pair of input terminals and the primary winding;

a synchronous rectifying circuit including a plurality of second switching devices and disposed between the pair of output terminals and the secondary winding, the second switching devices serving as rectifying devices;

a smoothing circuit disposed between the pair of output terminals and the secondary winding;

a first current detection circuit configured to detect a peak current value of a secondary current flowing through the secondary winding;

a second current detection circuit configured to detect a value of an output current outputted from the pair of output terminals, as an output current value; and a control circuit configured to control respective operations of the first switching devices of the inverter circuit and respective operations of the second switching devices of the synchronous rectifying circuit, wherein the control circuit is configured to set a timing of switching from an on-state to an off-state of each of the second switching devices based on the peak current value detected by the first current detection circuit and the output current value detected by the second current detection circuit, and wherein the control circuit is configured to set the timing of switching from the on-state to the off-state of each of the second switching devices using an equation below:

$$Ton=\{1/(2{\times}f)\}{\times}(\pi/2){\times}(|Ipk|/Iout)$$

where Ton represents a period of the on-state of corresponding one of the second switching devices, Ipk represents the peak current value, Iout represents the output current value, and f represents a switching frequency.

9. An electric power supply system comprising:

a pair of input terminals configured to receive an input voltage;

a pair of output terminals configured to output an output voltage;

a power supply configured to supply the input voltage to the pair of input terminals;

a transformer including a primary winding and a secondary winding;

an inverter circuit including a plurality of first switching devices and disposed between the pair of input terminals and the primary winding;

a synchronous rectifying circuit including a plurality of second switching devices and disposed between the pair of output terminals and the secondary winding, the second switching devices serving as rectifying devices;

a smoothing circuit disposed between the pair of output terminals and the secondary winding;

a first current detection circuit configured to detect a peak current value of a secondary current flowing through the secondary winding;

a second current detection circuit configured to detect a value of an output current outputted from the pair of output terminals, as an output current value; and a control circuit configured to control respective operations of the first switching devices of the inverter circuit and respective operations of the second switching devices of the synchronous rectifying circuit, wherein the control circuit is configured to set a timing of switching from an on-state to an off-state of each of the second switching devices based on the peak current value detected by the first current detection circuit and the output current value detected by the second current detection circuit, and wherein the control circuit is configured to set the timing of switching from the on-state to the off-state of each of the second switching devices using an equation below:

$$Ton=\{1/(2{\times}f)\}{\times}(\pi/2){\times}(|Ipk|/Iout)$$

where Ton represents a period of the on-state of corresponding one of the second switching devices, Ipk represents the peak current value, Iout represents the output current value, and f represents a switching frequency.

* * * * *